(12) United States Patent
Kim et al.

(10) Patent No.: US 12,136,009 B2
(45) Date of Patent: Nov. 5, 2024

(54) SMART IC SUBSTRATE, SMART IC MODULE, AND IC CARD INCLUDING THE SAME

(71) Applicant: LG INNOTEK CO., LTD., Seoul (KR)

(72) Inventors: Seung Joon Kim, Seoul (KR); Jun Young Lim, Seoul (KR); Yong Hyun Cho, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 483 days.

(21) Appl. No.: 17/447,020

(22) Filed: Sep. 7, 2021

(65) Prior Publication Data

US 2022/0076092 A1 Mar. 10, 2022

(30) Foreign Application Priority Data

Sep. 8, 2020 (KR) ........................ 10-2020-0114507

(51) Int. Cl.
*G06K 19/077* (2006.01)

(52) U.S. Cl.
CPC .. *G06K 19/07747* (2013.01); *G06K 19/07779* (2013.01)

(58) Field of Classification Search
CPC ................... G06K 19/07747; G06K 19/07779
(Continued)

(56) References Cited

U.S. PATENT DOCUMENTS 9,633,301 B2   4/2017  Mizoguchi et al.
10,417,548 B2  9/2019  Mathieu et al.
(Continued)

FOREIGN PATENT DOCUMENTS

CN    105378760 A    3/2016
CN    106205974 A    12/2016
(Continued)

OTHER PUBLICATIONS

European Search Report dated Feb. 14, 2022 in European Application No. 21194317.0.
(Continued)

*Primary Examiner* — Michael G Lee
*Assistant Examiner* — David Tardif
(74) *Attorney, Agent, or Firm* — Saliwanchik, Lloyd & Eisenschenk

(57) ABSTRACT

A smart IC substrate according to an embodiment includes: a substrate including one surface and the other surface; a circuit pattern and a connection circuit pattern disposed on the one surface; and a coil pattern disposed on the other surface, wherein a chip mounting region is formed on the other surface, the coil pattern is electrically connected to a first terminal and a second terminal, the substrate includes a first region disposed inside the coil pattern and a second region disposed outside the coil pattern, the first terminal is disposed in the first region, the second terminal is disposed in the second region, a first via is formed in the first region corresponding to the circuit pattern of the substrate, a second via is formed in the second region of the substrate, a third via is formed in the first region corresponding to the connection circuit pattern of the substrate, and a connection member is disposed inside the second via.

16 Claims, 9 Drawing Sheets

(58) Field of Classification Search
USPC .......................................................... 235/492
See application file for complete search history.

(56) References Cited

U.S. PATENT DOCUMENTS

| | | | |
|---|---|---|---|
| 10,515,750 B2 | 12/2019 | Jeong | |
| 2005/0194591 A1* | 9/2005 | Usami | G06K 7/0008 |
| | | | 257/E23.064 |
| 2013/0062419 A1 | 3/2013 | Finn et al. | |
| 2013/0265131 A1* | 10/2013 | Yang | H01F 17/0013 |
| | | | 29/602.1 |
| 2015/0269471 A1 | 9/2015 | Finn et al. | |
| 2015/0269476 A1 | 9/2015 | Calvas et al. | |
| 2016/0035480 A1* | 2/2016 | Hachiya | H01F 27/22 |
| | | | 336/200 |
| 2016/0104064 A1* | 4/2016 | Mizoguchi | H01L 24/43 |
| | | | 438/3 |
| 2016/0351319 A1 | 12/2016 | Jeong | |
| 2017/0316303 A1 | 11/2017 | Pachler et al. | |
| 2021/0406636 A1 | 12/2021 | Calvas et al. | |
| 2022/0076092 A1* | 3/2022 | Kim | G06K 19/07745 |

FOREIGN PATENT DOCUMENTS

| | | |
|---|---|---|
| FR | 2 996 944 A1 | 4/2014 |
| KR | 10-1015230 B1 | 2/2011 |
| WO | 2015/173514 A1 | 11/2015 |
| WO | 2020/094320 A1 | 5/2020 |

OTHER PUBLICATIONS

Office Action dated Mar. 13, 2023 in Chinese Application No. 202111037342.7.

* cited by examiner

SMART IC SUBSTRATE, SMART IC MODULE, AND IC CARD INCLUDING THE SAME

CROSS-REFERENCE TO RELATED APPLICATION

This application claims priority to 35 U.S.C. 119 Korean Application No. 10-2020-0114507, filed Sep. 8, 2020, which is herein incorporated by reference in its entirety.

TECHNICAL FIELD

An embodiment relates to a smart IC substrate, a smart IC module, and an IC card including the same.

BACKGROUND ART

An IC card may be formed by combining a smart IC module and a card module.

The smart IC module is a substrate on which an IC that stores personal security information required for electronic residence cards, credit card USIMs, etc. is mounted and may serve to transmit the corresponding information to a reader in a form of an electrical signal.

The smart IC module may be classified into a single type and a dual type according to a structure of the substrate and may be classified into contact, contactless, hybrid, and combi cards according to a form of a card used.

In detail, the contact smart IC module uses a method of transmitting and receiving information by physical contact, and the contactless smart IC module uses a method of transmitting and receiving information without physical contact using an NFC (traffic card, etc.) function, and the combi smart IC module and the hybrid smart IC module use a method that includes both the physical contact function and the NFC function without physical contact.

Meanwhile, recently, the combi card or the hybrid IC card to which the NFC function is applied has been widely used.

In order to implement the NFC function in the IC card, a signal exchange between the card module and the smart IC module should be performed. To this end, antennas may be disposed in each of the card module and the smart IC module, and the NFC function may be implemented by exchanging signals between the antennas disposed in the card module and the smart IC module.

In the related art, in order to place the antenna in the smart IC module, a separate antenna sheet including the antenna is inserted into the IC card, and the antenna sheet and the smart IC module are electrically connected by a flip chip method using a conductive adhesive or the like.

However, an antenna function of the smart IC module may be deteriorated due to a poor adhesion between the smart IC module and the antenna sheet, and accordingly, NFC characteristics of the IC card may be deteriorated.

In addition, when the antenna is directly disposed on the smart IC module, there may be a problem that an adhesive region for the smart IC module to be adhered to the card module is reduced due to arrangement of the antenna. In addition, after connecting the chip of the smart IC module and the antenna, there is a problem that the adhesive region of the smart IC module is reduced due to a molding member for protecting a connection region.

Therefore, there are required a smart IC substrate, a smart IC module, and an IC card including the same having a new structure capable of solving the above problems.

SUMMARY

Technical Problem

An embodiment is directed to providing a smart IC substrate, a smart IC module, and an IC card including the same, which may be easily adhered to the smart IC module and a card module and have improved adhesion.

Technical Solution

A smart IC substrate according to an embodiment includes: a substrate including one surface and the other surface; a circuit pattern and a connection circuit pattern disposed on the one surface; and a coil pattern disposed on the other surface, wherein a chip mounting region is formed on the other surface, the coil pattern is electrically connected to a first terminal and a second terminal, the substrate includes a first region disposed inside the coil pattern and a second region disposed outside the coil pattern, the first terminal is disposed in the first region, the second terminal is disposed in the second region, a first via is formed in the first region corresponding to the circuit pattern of the substrate, a second via is formed in the second region of the substrate, a third via is formed in the first region corresponding to the connection circuit pattern of the substrate, and a connection member is disposed inside the second via.

A smart IC substrate according to an embodiment includes: a substrate including one surface and the other surface; a circuit pattern and a connection circuit pattern disposed on the one surface; and a coil pattern and a chip disposed on the other surface, wherein the coil pattern is electrically connected to a first terminal and a second terminal, the substrate includes a first region disposed inside the coil pattern and a second region disposed outside the coil pattern, the first terminal is disposed in the first region, the second terminal is disposed in the second region, a third via formed in a region corresponding to the connection circuit pattern is formed in the first region of the substrate, a second via is formed in the second region of the substrate, a connection member is disposed inside the second via, and the coil pattern is connected to the chip through the connection circuit pattern exposed by the third via formed in the first region and the first terminal.

A smart IC substrate according to an embodiment includes: a substrate including one surface and the other surface; a circuit pattern and a connection circuit pattern disposed on the one surface; and a coil pattern and a chip disposed on the other surface, wherein the substrate includes a first via for connecting the circuit pattern and the chip with a wire and a second via and a third via for connecting the coil pattern and the chip, the coil pattern is electrically connected to a first terminal and a second terminal, the first terminal is connected to the chip by a wire, the second terminal is connected to the connection circuit pattern through the second via and is connected to the chip by the wire through the third via on the connection circuit pattern; the wire is surrounded by a molding member, the substrate includes a third region in which the molding member is not disposed on and a fourth region in which the molding member is disposed, and the second via and the second terminal are disposed in the third region, and the first via and the third via are disposed in the fourth region.

Advantageous Effects

A smart IC module according to an embodiment can include a coil pattern for transmitting and receiving radio frequencies.

In this case, a position of a molding member due to the connection between the coil pattern and a chip can be disposed inside the coil pattern by connecting both the coil pattern and the chip inside the coil pattern.

Therefore, it is possible to inhibit an adhesive region of the smart IC module due to the molding member from being reduced. In detail, the smart IC module is combined in an opening region of a card module to form an IC card, and in this case, the smart IC module can be adhered to the card module by applying an adhesive to an edge of a substrate.

At this time, since the coil pattern is disposed on the edge of the substrate, when the molding member extends to the outside of the coil pattern, the adhesive region on the substrate is reduced, so that the smart IC module and the card module may not be easily adhered, and adhesion may be deteriorated due to the reduction of the adhesive region.

Therefore, the smart IC module according to the embodiment forms a bending region bent in a chip direction on the coil pattern, thereby increasing the adhesive region of the smart IC module.

In addition, since the smart IC module according to the embodiment connects a wire for wire bonding of the coil pattern and the chip inside the coil pattern through a connection circuit pattern and a connection member disposed on a via of the connection circuit pattern, it is possible to inhibit the molding member for protecting the wire from passing to the outside of the coil pattern.

Accordingly, since the smart IC module according to the embodiment can secure the adhesive region combined to the card module with a sufficient size, the smart IC module and the card module can be easily adhered, and the adhesion can be improved by increasing the adhesive region.

In addition, the smart IC module according to the embodiment does not directly wire-bond the chip and a second terminal of the coil pattern, and the smart IC module connects by wire bonding in a region closer to the chip than the second terminal through the connection member, thereby reducing the arrangement area of the molding member.

Therefore, since it is not necessary to dispose the molding member up to the second terminal disposed on the edge of the substrate, the smart IC module and the card module can be easily adhered through the edge of the substrate.

DETAILED DESCRIPTION OF THE EMBODIMENTS

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may In addition include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, a smart IC substrate, a smart IC module, and an IC card including the same according to an embodiment will be described with reference to the drawings.

Figure 1:
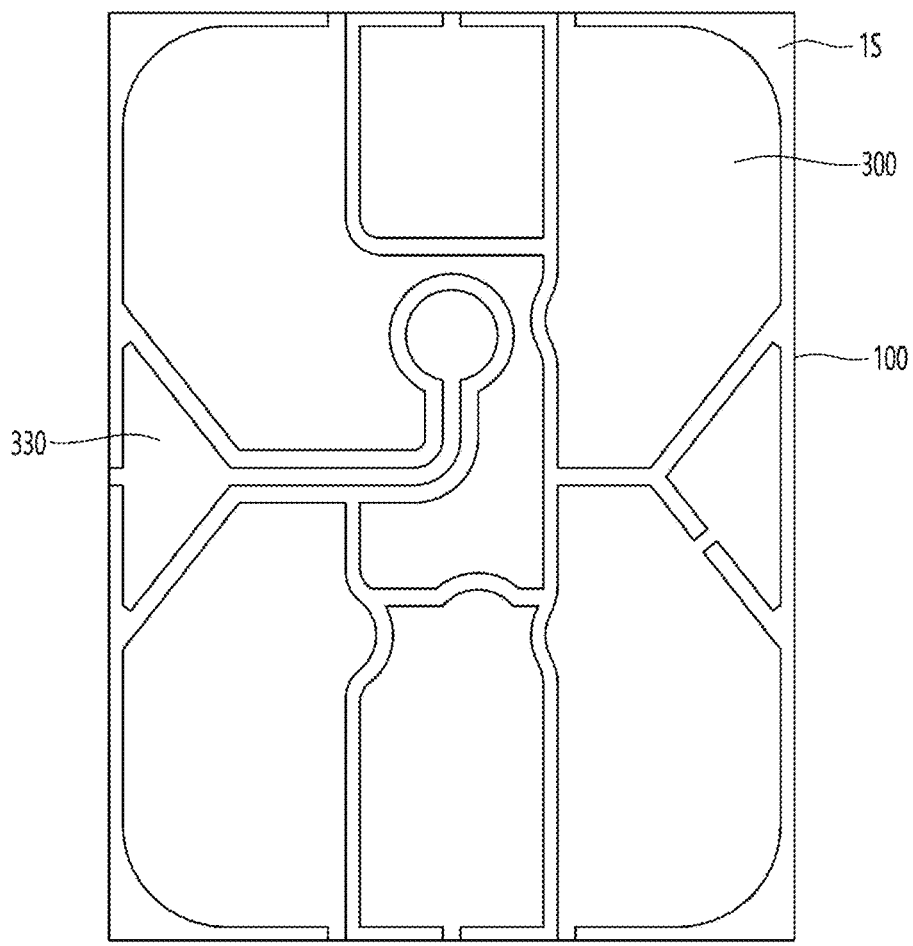
FIG. 1 is a view showing a top view of a first surface of a smart IC substrate according to an embodiment.
Figure 2:
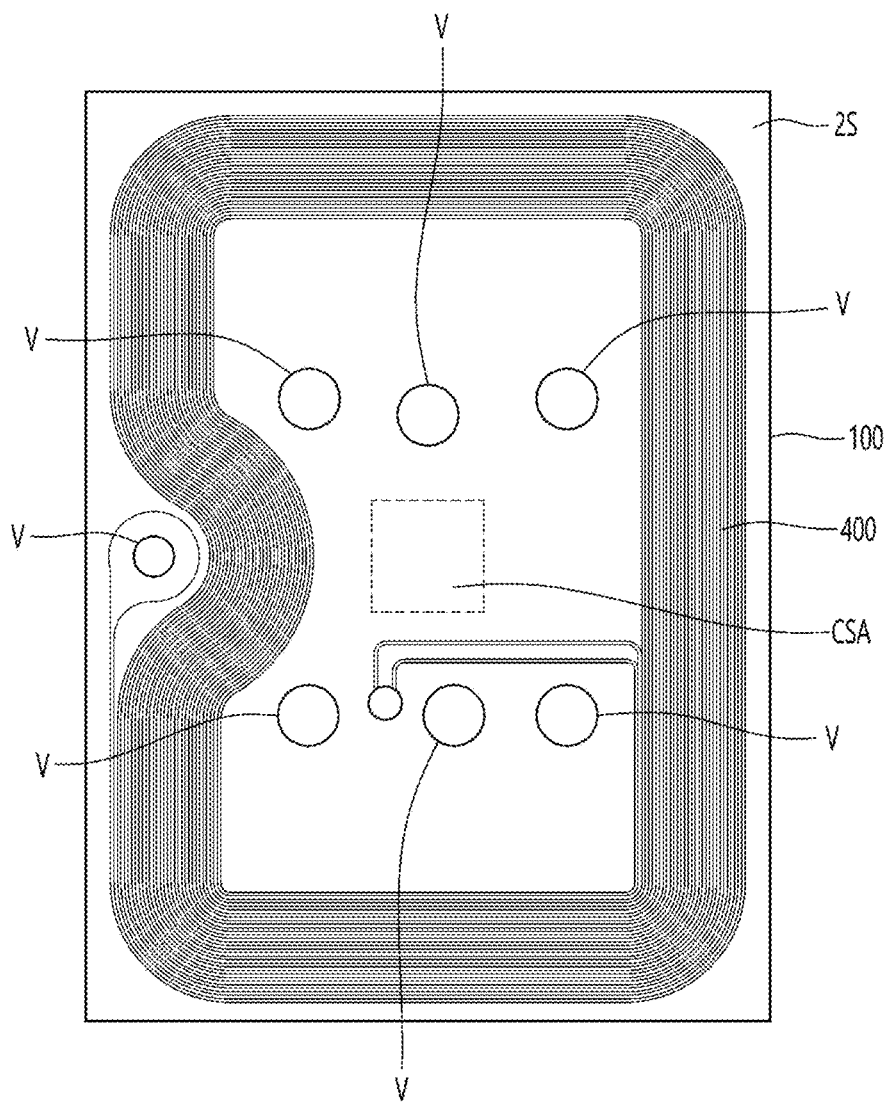
FIG. 2 is a view showing a top view of a second surface of the smart IC substrate according to the embodiment.

FIGS. 1 and 2 are views showing top views of a first surface and a second surface of the smart IC substrate according to the embodiment.

Referring to FIGS. 1 and 2, a smart IC substrate 1000 may include a first surface 1S and a second surface 2S opposite to the first surface. A chip may be mounted on the smart IC substrate 1000 to form a smart IC module. The first surface 1S may be a contact side of the smart IC substrate 1000. In addition, the second surface 2S may be a bonding side of the smart IC substrate 1000.

That is, the first surface 1S may be a surface capable of recognizing information of the smart IC module through direct or indirect contact with the IC card, and the second surface 2S may be a surface adhered to a card module 2000.

Referring to FIG. 1, a circuit pattern 300 and a connection circuit pattern 330 may be disposed on the first surface 1S. In detail, a plurality of circuit patterns 300 disposed on the substrate 100 and spaced apart from each other and the connection circuit pattern 330 spaced apart from the circuit pattern 300 may be disposed on the first surface 1S.

In addition, referring to FIG. 2, a coil pattern 400 may be disposed on the second surface 2S. In detail, the coil pattern 400 disposed on the substrate 100 may be disposed on the second surface 2S.

In addition, a plurality of vias V may be formed on the second surface 2S. In detail, the via V may be disposed at a position corresponding to each of the plurality of circuit patterns 300 and the connection circuit pattern 330 disposed on the first surface 1S.

In addition, the second surface 2S may include a chip mounting region CSA in which a chip connected to the circuit pattern 300, the connection circuit pattern 330, and the coil pattern 400 is disposed. That is, the chip may be disposed on the second surface 2S, and the chip may be disposed on the chip mounting region CSA.

Figure 3:
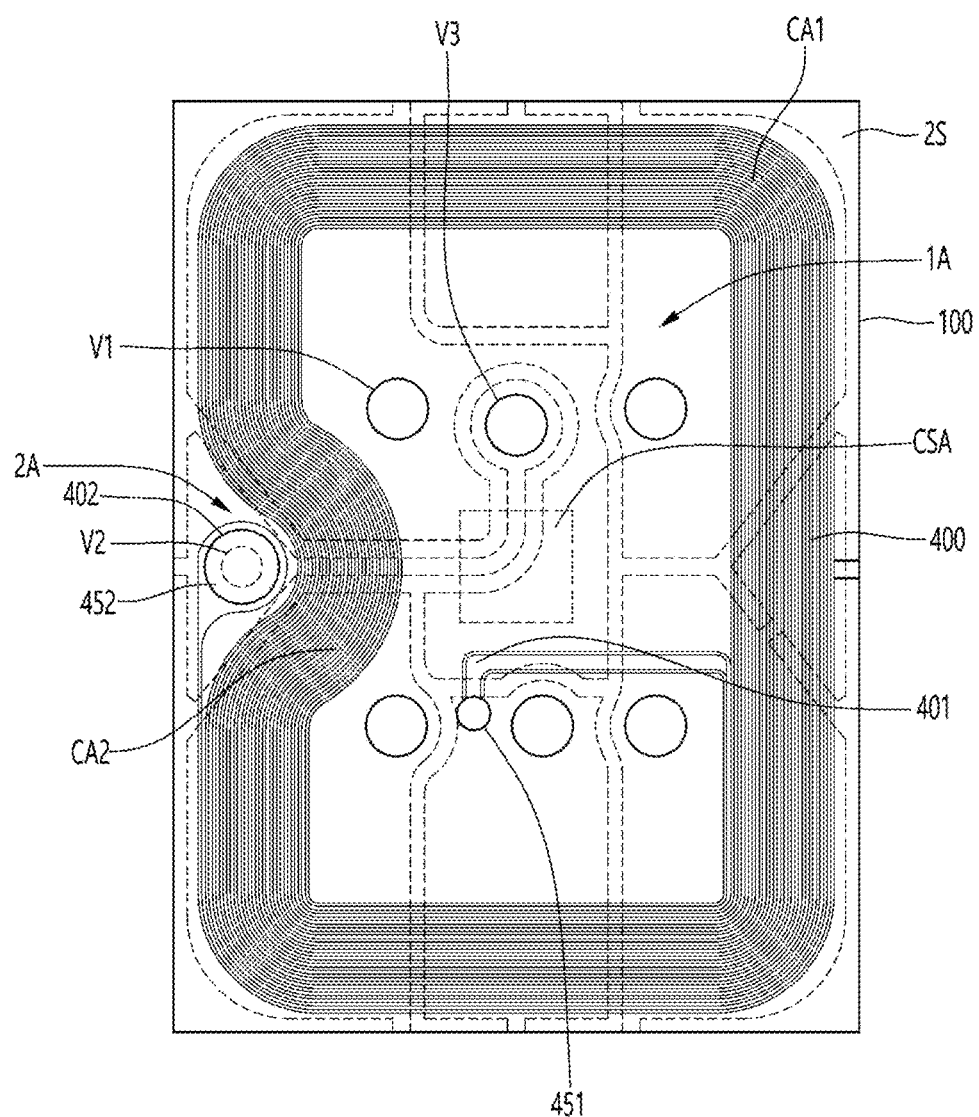
FIG. 3 is a top view of the second surface of the smart IC substrate according to the embodiment and is a view showing both a coil pattern and a circuit pattern.
Figure 4:
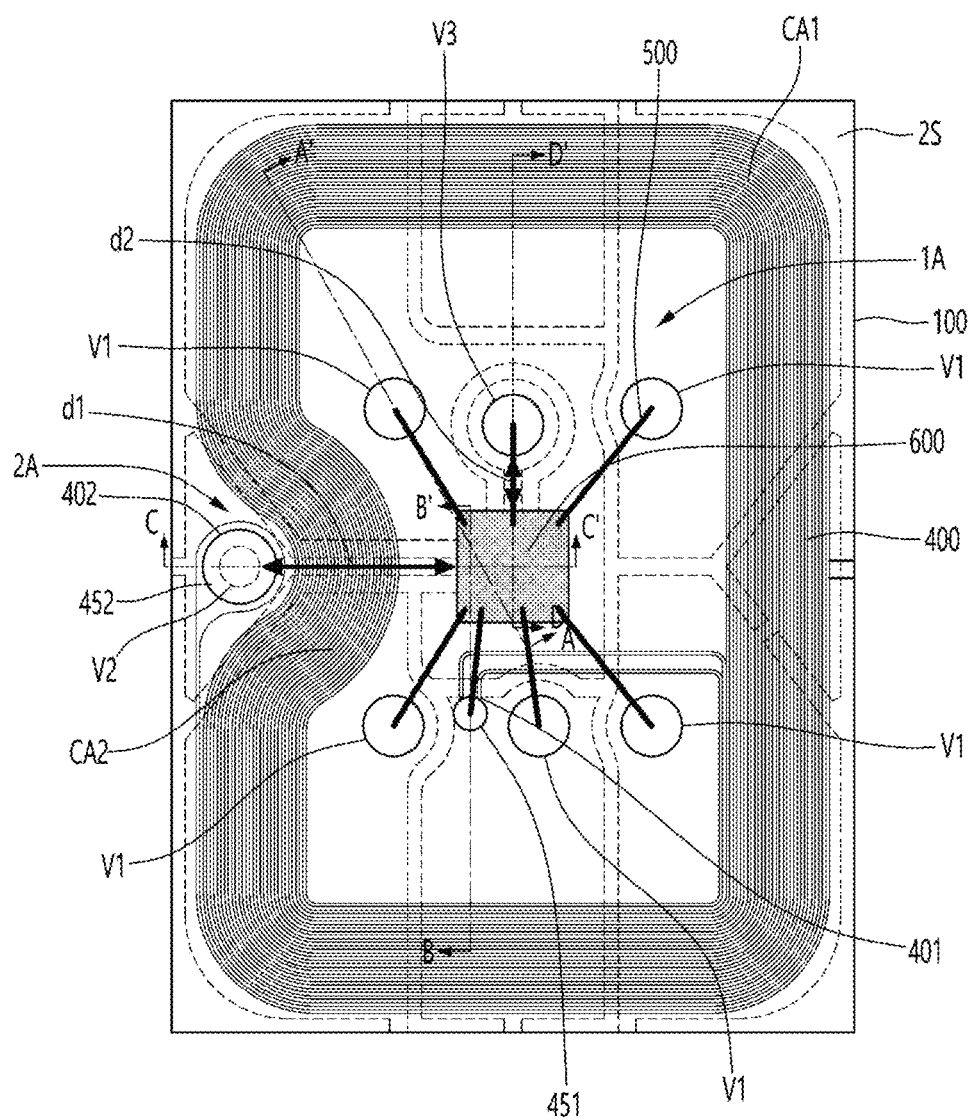
FIG. 4 is a top view of the second surface of a smart IC module according to an embodiment and is a view showing both a coil pattern and a circuit pattern.

FIG. 3 is a view showing a top view of a second surface of a smart IC substrate in which a chip is not disposed in a chip mounting region, and FIG. 4 is a view showing a top view of a second surface of a smart IC module in which the chip is disposed in the chip mounting region.

Referring to FIGS. 3 and 4, the circuit pattern 300 and the chip 600 may be connected. In detail, a first via V1 may be formed on a region of the substrate 100 corresponding to the circuit pattern 300, and the chip 600 may be electrically connected to the circuit pattern 300 exposed through the first via V1 by bonding of a wire 500. That is, the first via V1 may be defined as a via for connecting the chip 600 and the circuit pattern 300.

In addition, the coil pattern 400 and the chip 600 may be connected. In detail, the coil pattern 400 may include a coil pad portion. In detail, a first terminal 401 of the coil pattern 400 may be connected to a first coil pad portion 451, and a second terminal 402 of the coil pattern 400 may be connected to a second coil pad portion 452.

The first coil pad portion 451 may be a part of a fourth layer to be described below. That is, the fourth layer may be used as it is without forming the first coil pad portion 451 through a separate process. In this case, the fourth layer may be formed through plating.

In addition, the second coil pad portion 452 may be a part of a connection member 800 to be described below. That is, a part of the connection member 800 may be used as it is without forming the second coil pad portion 452 through a separate process. That is, the second coil pad portion 452 may be integrally formed with the connection member 800. In this case, a width of the second coil pad portion 452 may be greater than a width of the second via V2.

The coil pattern 400 may be electrically connected to the chip 600 through the coil pad portion.

For example, the coil pattern 400 may be connected to the chip 600 through wire bonding. In this case, any one of the first coil pad portion 451 and the second coil pad portion 452 of the coil pattern 400 may not be directly bonded to the wire 500 and may be indirectly connected with the wire 500.

Accordingly, when the smart IC module is adhered to the card module, an adhesive region of the smart IC module may be secured wide. The connection between the coil pattern 400 and the chip 600 will be described in detail below.

Hereinafter, the connection between the circuit pattern and the chip and the connection between the coil pattern and the chip of the smart IC module according to an embodiment will be described in detail with reference to FIGS. 5 to 8.

Figure 5:
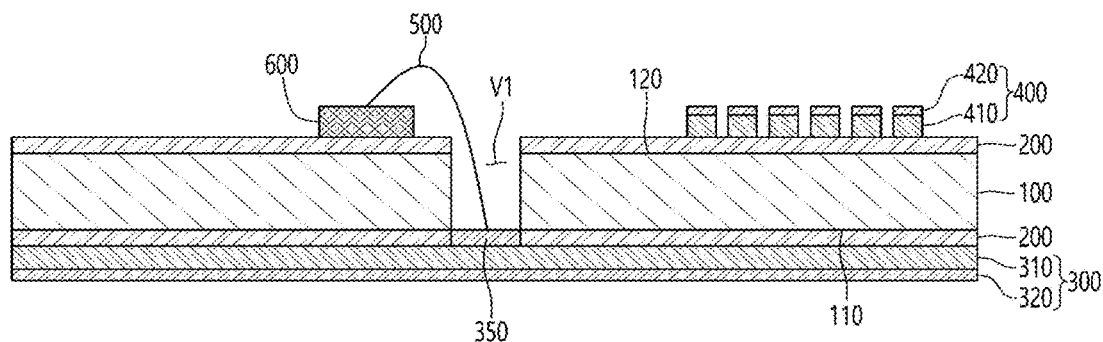
FIG. 5 is a view showing a cross-sectional view taken along line A-A' of FIG. 4.

FIG. 5 is a cross-sectional view taken along line A-A' of FIG. 4 and is a cross-sectional view of a connection region between the circuit pattern 300 and the chip 600.

Referring to FIG. 5, the smart IC module may include the substrate 100. The substrate 100 may be an insulating substrate. The substrate 100 may include a resin material. The substrate 100 may include one surface 110 and the other surface 120. The one surface 110 may be defined as a surface corresponding to the first surface 1S of the smart IC substrate or module described above, and the other surface 120 may be defined as a surface corresponding to the second surface 2S of the smart IC substrate or module described above.

The substrate 100 may include prepreg including glass fiber. In detail, the substrate 100 may include an epoxy resin and a material in which glass fiber and a silicon-based filler are dispersed in the epoxy resin.

In addition, the substrate 100 may be rigid or flexible. For example, the substrate 100 may include glass or plastic. In detail, the substrate 100 may include a chemically tempered/semi-tempered glass, such as soda lime glass, aluminosilicate glass, etc., a tempered or flexible plastic such as polyimide (PI), polyethylene terephthalate (PET), propylene glycol (PPG), polycarbonate (PC), etc., or sapphire.

In addition, the substrate 100 may include a photoisotropic film. For example, the substrate 100 may include cyclic olefin copolymer (COC), cyclic olefin polymer (COP), photoisotropic polycarbonate (PC), photoisotropic polymethyl methacrylate (PMMA), or the like.

Further, the substrate 100 may be partially bent while having a curved surface. That is, the substrate 100 may partially have a plane and may partially be bent while having a curved surface. In detail, an end portion of the substrate 100 may be bent while having a curved surface or may be bent or crooked while having a surface with a random curvature.

Furthermore, the substrate 100 may be a flexible substrate having flexibility. Also, the substrate 100 may be a curved or bent substrate.

An adhesive layer 200 may be disposed on the one surface 110 and the other surface 120 of the substrate 100. The adhesive layer 200 may be disposed on the entire surface of the one surface and the other surface of the substrate 100. In detail, the adhesive layer 200 may be disposed on the entire surface of the one surface and the other surface of the substrate except for a via-formed region.

The adhesive layer 200 may include a resin material. For example, the adhesive layer 200 may include at least one of an epoxy resin, an acrylic resin, and a polyimide resin. In addition, the adhesive layer 200 may further include additives such as natural rubber, a plasticizer, a hardner, a phosphorus-based flame retardant, and the like in order to impart flexibility to the adhesive layer 200.

A circuit pattern 300 may be disposed on the one surface 110 of the substrate 100. The circuit pattern 300 may be disposed on the adhesive layer 200 on the substrate 100. The circuit pattern 300 may be formed by depositing a metal material on the adhesive layer 200 and then patterning the metal material by exposure, development, and etching processes.

The circuit pattern 300 may include multiple layers. For example, the circuit pattern 300 may include a first layer 310 and a second layer 320 on the first layer 310.

The first layer 310 may include a metal material having high electrical conductivity. For example, the first layer 310 may include at least one of gold (Au), silver (Ag), platinum (Pt), titanium (Ti), tin (Sn), copper (Cu), and zinc (Zn). Preferably, the first layer 310 may include copper (Cu).

The second layer 320 may be disposed on the first layer 310. The second layer 320 may be disposed on the first layer 310 to protect the first layer 310. That is, the second layer 320 may be disposed on the first layer 310 to inhibit corrosion of the first layer 310. That is, the second layer 320 may be a protective layer of the circuit pattern 300.

The second layer 320 may include nickel-gold (Ni—Au) or nickel-lead (Ni—Pd), but the embodiment is not limited thereto. For example, the second layer 320 may be formed by forming a nickel layer on the first layer 310 and then disposing a gold layer on the nickel layer or by forming the nickel layer on the first layer 310 and then disposing a lead layer on the nickel layer. In this case, a nickel-gold alloy layer may be formed between the nickel layer and the gold layer, and a nickel-lead alloy layer may be formed between the nickel layer and the lead layer.

The second layer 320 may implement various colors depending on the type of material to give a color to the contact side of the smart IC module.

The first layer 310, the second layer 320, and the adhesive layer 200 may have different thicknesses.

In detail, the thickness of the first layer 310 may be greater than the thickness of the second layer 320 and the thickness of the adhesive layer 200. Also, the thickness of the adhesive layer 200 may be greater than the thickness of the second layer 320.

For example, the thickness of the first layer 310 may be 35 μm to 70 μm, the thickness of the second layer 320 may be 0.1 μm or less, and the thickness of the adhesive layer 200 may be 15 μm to 30 μm.

The coil pattern 400 may be disposed on the other surface 120 of the substrate 100. The coil pattern 400 may be disposed on the adhesive layer 200 on the other surface 120 of the substrate 100.

The coil pattern 400 may be formed by depositing a metal material on the adhesive layer 200 and then patterning the metal material by exposure, development, and etching processes.

The coil pattern 400 may include multiple layers. For example, the coil pattern 400 may include a third layer 410 and a fourth layer 420 on the third layer 410.

The third layer 410 may include a metal material having high electrical conductivity. For example, the third layer 410 may include a material the same as or similar to that of the first layer 310 described above. For example, the third layer 410 may include at least one of gold (Au), silver (Ag), platinum (Pt), titanium (Ti), tin (Sn), copper (Cu), and zinc (Zn). Preferably, the third layer 410 may include copper (Cu).

The fourth layer 420 may be disposed on the third layer 410. The fourth layer 420 may be disposed on the third layer 410 to protect the third layer 410. That is, the fourth layer 420 may be disposed on the third layer 410 to inhibit corrosion of the third layer 410. That is, the fourth layer 420 may be a protective layer of the coil pattern 400.

The fourth layer 420 may include a material the same as or similar to that of the second layer 320 described above. For example, the fourth layer 420 may include nickel-gold (Ni—Au) or nickel-lead (Ni—Pd), but the embodiment is not limited thereto. For example, the fourth layer 420 may be formed by forming a nickel layer on the third layer 410 and then disposing a gold layer on the nickel layer or by forming the nickel layer on the third layer 410 and then disposing a lead layer on the nickel layer. In this case, a nickel-gold alloy layer may be formed between the nickel layer and the gold layer, and a nickel-lead alloy layer may be formed between the nickel layer and the lead layer.

The fourth layer 420 may implement various colors depending on the type of material to give a color to the contact side of the smart IC module.

The third layer 410, the fourth layer 420, and the adhesive layer 200 may have different thicknesses.

In detail, the thickness of the third layer 410 may be greater than the thickness of the fourth layer 420 and the thickness of the adhesive layer 200. Also, the thickness of the adhesive layer 200 may be greater than the thickness of the fourth layer 420.

For example, the thickness of the third layer 410 may be 35 μm to 70 μm, the thickness of the fourth body 420 may be 0.1 μm or less, and the thickness of the adhesive layer 200 may be 15 μm to 30 μm.

Meanwhile, the fourth layer 420 may also be disposed on the circuit pattern 300 through the first via V1. In detail, the second layer 320 may be disposed on one surface of the circuit pattern 300 exposed through the first via V1, and the fourth layer 420 may be disposed on the other surface.

Accordingly, a circuit pad portion 350 formed by the fourth layer may be disposed on the other surface of the circuit pattern 300 exposed through the first via V1.

Each of the plurality of circuit patterns 300 may be connected to the chip 600. In detail, the circuit pattern 300 may be electrically connected to the chip 600 by a wire bonding method.

Referring to FIGS. 4 and 5, the first via V1 may be formed on the substrate 100 and the adhesive layer 200 to connect the circuit patterns 300 and the chip 600. That is, the first via V1 may be formed by removing the other surface 120 of the substrate 100 in a region corresponding to the circuit pattern 300 to be connected to the chip 600 and the adhesive layer 200 on the other surface 120. That is, the first via V1 may be formed on a region corresponding to each of the plurality of circuit patterns 300 disposed on one surface 110 of the substrate 100.

Accordingly, the circuit pattern 300 may be exposed through the first via V1. The chip 600 may be wire-bonded to the circuit pad portion 350 of the circuit pattern 300 exposed through the first via V1 by the wire 500. Subsequently, a molding member for protecting the wire bonding may be formed on the wire 500.

Accordingly, the plurality of circuit patterns 300 may be respectively connected to the chip 600 by wire bonding, whereby the plurality of circuit patterns 300 may be electrically connected to the chip 600.

Figure 6:
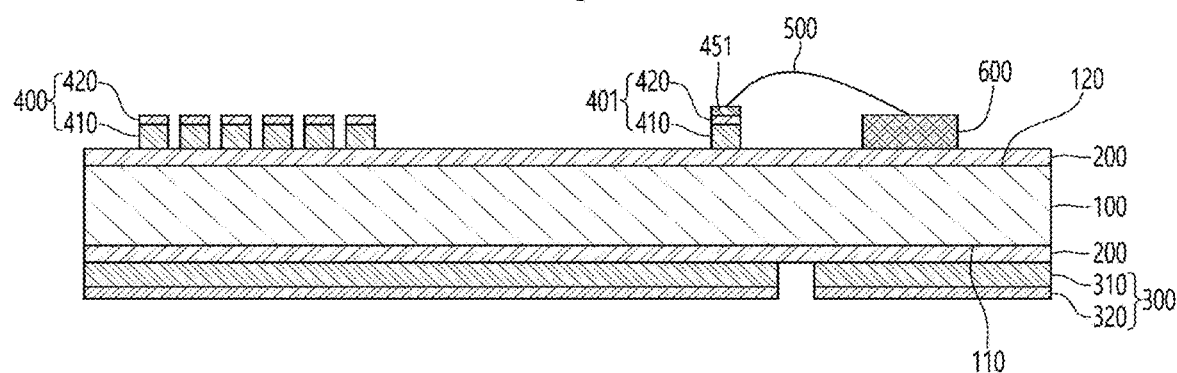
FIG. 6 is a view showing a cross-sectional view taken along line B-B' of FIG. 4.
Figure 7:
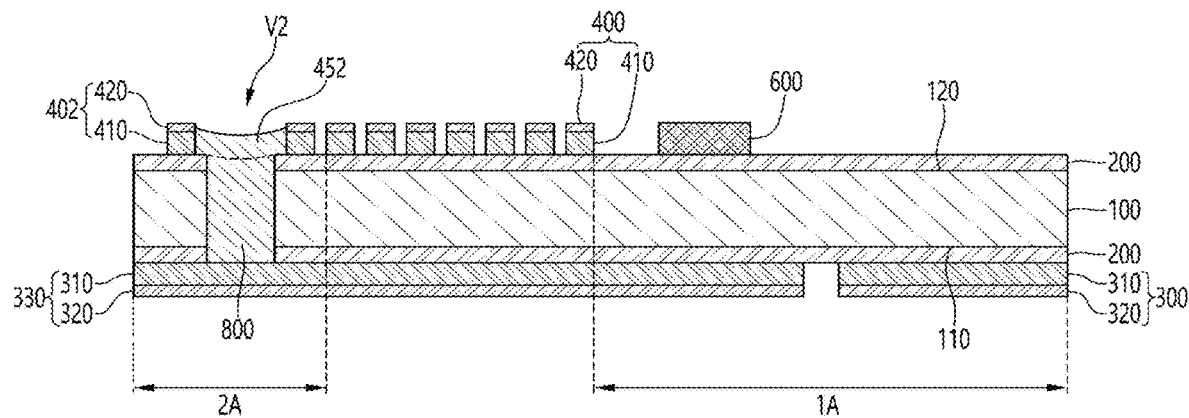
FIG. 7 is a view showing a cross-sectional view taken along line C-C' of FIG. 4.
Figure 8:
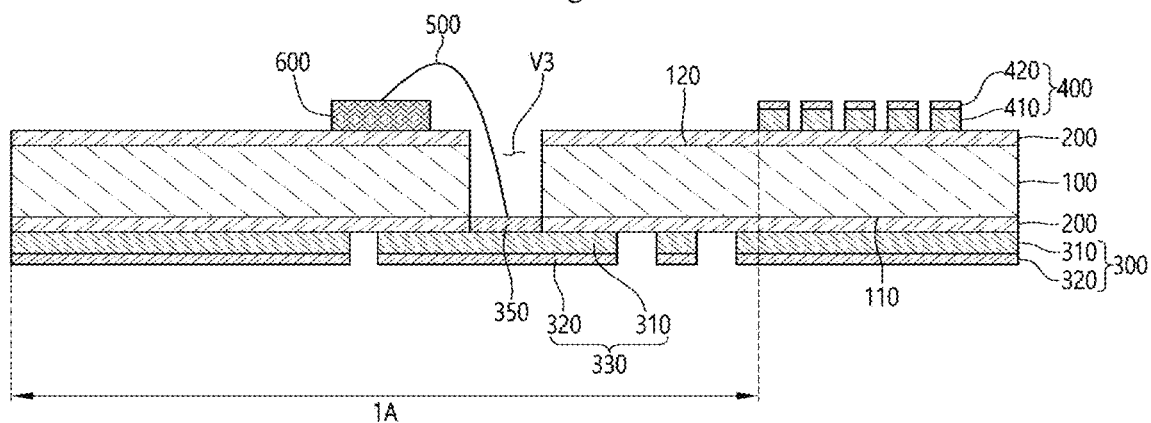
FIG. 8 is a view showing a cross-sectional view taken along line D-D' of FIG. 4

FIGS. 6 to 8 are cross-sectional views for describing the connection between the coil pattern 400 and the chip 600.

FIG. 6 is a cross-sectional view taken along line B-B' of FIG. 4 and is a cross-sectional view of a connection region between the coil pattern 400 and the chip 600.

Referring to FIG. 4, the coil pattern 400 may be electrically connected to the first terminal 401 and the second terminal 402. The first terminal 401 may be a terminal connected to one end portion of the coil pattern 400, and the second terminal 402 may be a terminal connected to the other end portion of the coil pattern 400.

The coil pattern 400 may be formed in a loop shape as a whole while extending from the first terminal 401 to the second terminal 402.

Accordingly, the other surface 120 of the substrate 100 on which the coil pattern 400 is disposed may include a first region 1A defined inside a loop of the coil pattern 400 and a second region 2A defined outside the loop of the coil pattern 400. That is, the first region 1A may be a region surrounded by the coil pattern 400, and the second region 2A may be an external region of the coil pattern 400.

The chip mounting region CSA may be disposed in the first region 1A. That is, the chip 600 disposed in the chip mounting region CSA may be disposed surrounded by the coil pattern 400.

In addition, the first terminal 401 may be disposed in the first region 1A, and the second terminal 402 may be disposed in the second region 2A. That is, the first terminal 401 and the second terminal 402 may be disposed in different regions based on the loop-shaped coil pattern 400.

In addition, the first via V1 may be disposed in the same region as the first terminal 401. In detail, both the first via V1 and the first terminal 401 may be disposed in the first region 1A.

The coil pattern 400 may include at least one bending region CA. In detail, the coil pattern 400 may include a first bending region CA1 and a second bending region CA2. The first bending region CA1 may be disposed in a corner region of the coil pattern 400. The coil pattern 400 may be disposed in a loop shape by the first bending regions CA1.

The second bending region CA2 may be disposed between the first bending regions CA1. The second bending region CA2 may be a region in which the coil pattern 400 is bent in a convex shape so as to be close in a direction of the chip mounting region CSA or the chip 600.

FIGS. 2 to 4 illustrate that the coil pattern 400 includes only one second bending region CA2, but the embodiment is not limited thereto, and the coil pattern 400 may include a plurality of second bending regions.

The second bending region CA2 may be bent in a convex shape. In detail, the second bending region CA2 may be formed in the convex shape bent in the direction of the chip mounting region CSA or the chip 600. Accordingly, the second bending region CA2 of the coil pattern 400 may be disposed closer to the chip mounting region CSA or the chip 600 than other regions that are not bent.

A length of the coil pattern 400 may be increased by the second bending region CA2. Accordingly, as the length of the coil pattern increases, it is possible to improve sensing characteristics of surrounding radio frequency signals when the IC card is used.

Referring to FIGS. 3 and 6, the first terminal 401 of the coil pattern 400 may be connected to the chip 600. In detail, the first terminal 401 may be connected to the first coil pad portion 451, and the chip 600 and the first coil pad portion 451 may be wire-bonded by the wire 500 to be electrically connected.

The first coil pad portion 451 may include a material the same as or similar to that of the fourth layer 420 described above.

Alternatively, as described above, the first coil pad portion 451 may be omitted, and the wire 500 may be bonded to the fourth layer 420 to be electrically connected.

Subsequently, the molding member for protecting the wire bonding may be formed on the wire 500. Accordingly, the chip 600 and the first terminal 401 may be directly connected.

Meanwhile, the second terminal 402 of the coil pattern 400 should also be connected to the chip 600. At this time, when the second terminal 402 disposed on the second region 2A, that is, the outside of the coil pattern 400 is directly connected to the chip 600 by the wire, the adhesive region of the smart IC module may not be sufficiently secured by the molding member formed for protecting the wire bonding after the connection.

Accordingly, in the smart IC module according to the embodiment, the second terminal 402 of the coil pattern is indirectly connected to the chip 600 to solve the above problem.

FIG. 7 is a cross-sectional view taken along line C-C' of FIG. 4, and FIG. 7 is a cross-sectional view taken from the second terminal of the coil pattern in the direction of the chip 600.

Referring to FIGS. 4 and 7, the connection circuit pattern 330 may be disposed on one surface of the substrate 100, and the coil pattern 400 may be disposed on the other surface of the substrate 100. In detail, the second terminal 402 of the coil pattern 400 may be disposed on the other surface of the substrate 100.

That is, the second terminal 402 may be disposed on a region overlapping the connection circuit pattern 300.

The connection circuit pattern 330 among the plurality of circuit patterns disposed on one surface of the substrate 100 may be a circuit pattern for indirectly connecting the second terminal 402 of the coil pattern 400 and the chip 600.

The connection circuit pattern 330 may be disposed in the first region 1A and the second region 2A. In detail, the connection circuit pattern 330 may extend toward the second region 2A from the first region 1A. That is, the connection circuit pattern of the first region 1A and the connection circuit pattern of the second region 2A may be integrally formed.

In addition, the second via V2 may be formed on the substrate 100. In detail, the second via V2 formed by removing the other surface 120 of the substrate 100 and the adhesive layer 200 on the other surface 120 may be formed in the substrate 100 adjacent to the second terminal 402. Accordingly, the connection circuit pattern 330 disposed on one surface of the substrate 100 may be exposed through the second via V2. That is, the second via V2 may be formed on a region corresponding to the connection circuit pattern 330 of the second region 2A, and the connection circuit pattern 330 of the second region 2A may be exposed by the second via V2.

The second via V2 may be disposed in a region different from that of the first via V1. In detail, the second via V2 may be disposed in the second region 2A, and the first via V1 may be disposed in the first region 1A. That is, the first via V1 may be disposed inside the coil pattern 400, and the second via V2 may be disposed outside the coil pattern 400.

The connection member 800 may be disposed inside the second via V2. In detail, the connection member 800 connecting the connection circuit pattern 330 and the coil pattern 400 may be disposed inside the second via V2.

The connection member 800 may include a conductive material. In detail, the connection member 800 may include a conductive paste. For example, the connection member 800 may include a conductive paste including a conductive material of at least one of gold (Au), silver (Ag), platinum (Pt), titanium (Ti), tin (Sn), copper (Cu), and zinc (Zn), and as the conductive paste is cured after filling the second via V2, the connection member 800 may be disposed inside the second via V2.

Accordingly, the connection circuit pattern 330 and the second terminal 402 of the coil pattern may be connected to each other by the connection member 800.

In detail, the second terminal 402 of the coil pattern may be connected to the second coil pad portion 452, and the connection member 800 may be connected to the second coil pad portion 452. Accordingly, the connection member 800 may be connected to the connection circuit pattern 330 and the second coil pad portion 452. The second coil pad portion 452 may include the same material as the connection member 800. Alternatively, the second coil pad portion 452 may include a material the same as or similar to that of the fourth layer 420.

Referring to FIG. 8, the connection circuit pattern 330 may be disposed on one surface of the substrate 100, and the coil pattern 400 may be disposed on the other surface of the substrate 100.

A third via V3 may be formed in the substrate 100. In detail, the third via V3 formed by removing the other surface 120 of the substrate 100 and the adhesive layer 200 on the other surface 120 may be formed in the substrate 100 of a region corresponding to the connection circuit pattern 330 of the first region 1A. That is, the third via V3 may be formed on the region corresponding to the connection circuit pattern 330 of the first region 1A, and the connection circuit pattern 330 of the first region 1A may be exposed by the third via V3. Accordingly, the connection circuit pattern 330 disposed on one surface of the substrate 100 may be exposed through the third via V3.

The third via V3 may be disposed in the same region as the first via V1. In detail, the first via V1 and the third via V3 may be disposed in the first region 1A. That is, the first via V1 and the third via V3 may be disposed inside the coil pattern 400.

In addition, a distance d1 between the chip 600 and the second via V2 may be different from a distance d2 between the chip 600 and the third via V3.

For example, the distance d1 between the chip 600 and the second via V2 may be greater than the distance d2 between the chip and the third via V3.

Through this, the smart IC module may be efficiently mounted when mounting on the smart card, and a thickness of a region occupied by the smart IC module in the smart card may be reduced, thereby reducing the overall thickness of the smart card.

The chip 600 and the connection circuit pattern 330 may be electrically connected to each other. In detail, a connection circuit pad portion 350 may be disposed on the connection circuit pattern 330 exposed through the third via V3, and the chip 600 and the connection circuit pad portion 350 may be wire-bonded by the wire 500 to be electrically connected. That is, the third via V3 may be defined as a via for connecting the chip 600 and the connection circuit pattern 330.

Accordingly, the chip 600 and the second terminal 402 may be electrically connected. That is, the chip 600 and the second terminal 402 may be indirectly connected. That is, the chip 600 may be not wire-bonded to the second terminal 402 and may be electrically connected to the second terminal 402 by the wire 500, the connection circuit pattern 330, and the connection member 800.

Accordingly, the chip 600 and the coil pattern 400 may be connected to the coil pattern 400 by wire bonding in the first region 1A, that is, inside the coil pattern 400. That is, the first terminal 401 may be directly connected to the chip 600 by wire bonding, and the second terminal 402 may be indirectly connected to the chip 600 through the wire, the connection circuit pattern 330, and the connection member 800.

Therefore, after wire bonding the chip 600 and the coil pattern 400, the molding member for protecting the wire and the wire connection region may be formed only in the first region 1A and may not be formed in the second region 2A.

Accordingly, since the molding member is not formed in the second region 2A where the adhesive region of the smart IC module is positioned, it is possible to inhibit the adhesive region of the smart IC module from being decreased by the molding member.

The smart IC module according to the embodiment may include a coil pattern for transmitting and receiving radio frequencies.

In this case, a position of the molding member due to the connection between the coil pattern and the chip may be disposed inside the coil pattern by connecting both the coil pattern and the chip inside the coil pattern.

Therefore, it is possible to inhibit the adhesive region of the smart IC module due to the molding member from being reduced. In detail, the smart IC module is combined in an opening region of the card module to form the IC card, and in this case, the smart IC module may be adhered to the card module by applying an adhesive to an edge of the substrate.

At this time, since the coil pattern is disposed on the edge of the substrate, when the molding member extends to the outside of the coil pattern, the adhesive region on the substrate is reduced, so that the smart IC module and the card module may not be easily adhered, and adhesion may be deteriorated due to the reduction of the adhesive region.

Therefore, the smart IC module according to the embodiment forms the bending region bent in a chip direction on the coil pattern, thereby increasing the adhesive region of the smart IC module.

In addition, since the smart IC module according to the embodiment connects both wire bonding of the coil pattern and the chip inside the coil pattern through the connection circuit pattern and the connection member disposed on the via of the connection circuit pattern, it is possible to inhibit the molding member for protecting the wire from passing to the outside of the coil pattern.

Accordingly, since the smart IC module according to the embodiment may secure the adhesive region combined to the card module with a sufficient size, the smart IC module and the card module may be easily adhered, and the adhesion may be improved by increasing the adhesive region.

In addition, even though a distance between the second terminal of the coil pattern and the chip is increased, a wire length is not increased by wire bonding with the chip, and thus, when forming the coil pattern, it is possible to reduce the restriction on design freedom due to the distance from the chip.

Hereinafter, a smart IC module according to another embodiment will be described with reference to FIGS. 9 to 14.

In the description of the smart IC module according to another embodiment, descriptions the same as or similar to those of the smart IC module according to the above-described embodiment are omitted, and the same reference numerals are given to the same components.

Figure 9:
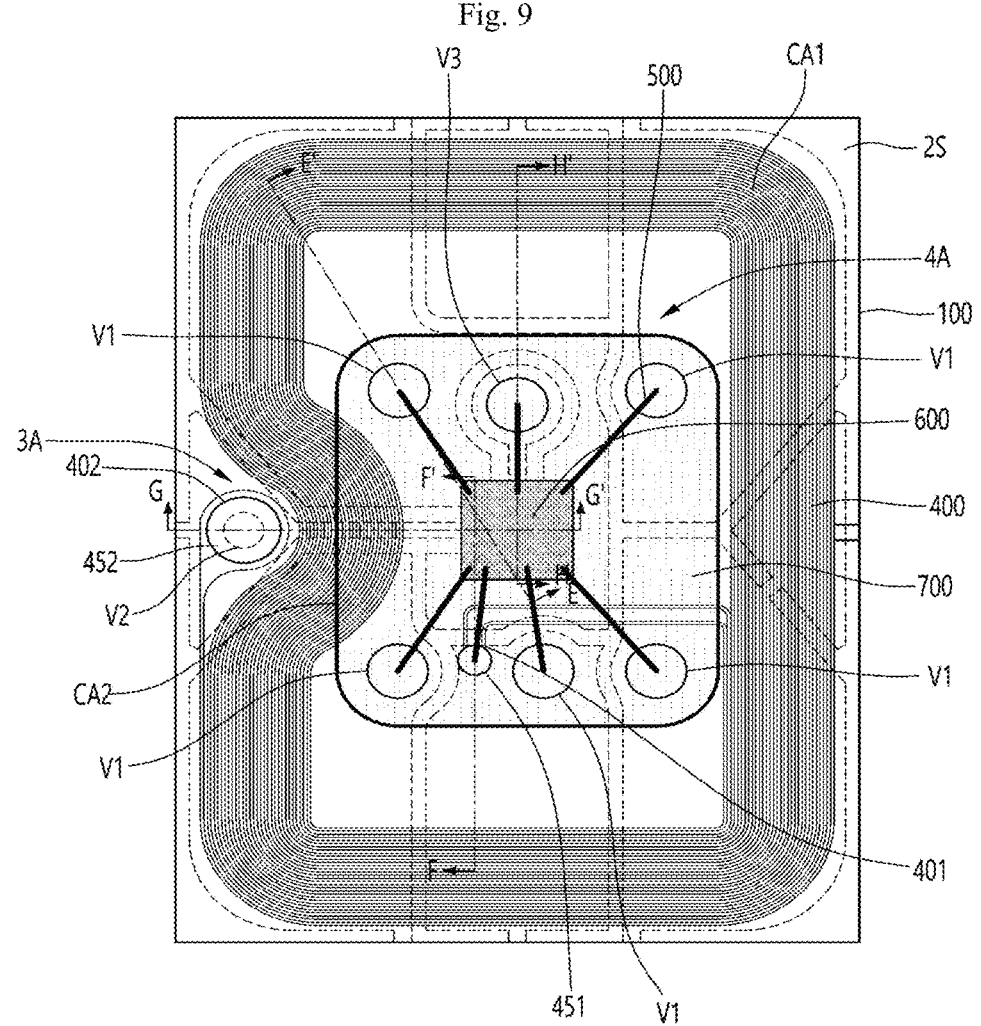
FIG. 9 is a top view of a first surface of a smart IC substrate according to another embodiment and is a view showing both a coil pattern and a circuit pattern.

Referring to FIG. 9, the smart IC module according to another embodiment may include a molding member 700.

The molding member 700 may be disposed while surrounding a connection region of the chip 600, the circuit pattern 300 connected through the chip 600 and the wire 500, and the coil pattern 400. That is, the molding member 700 may be disposed on the other surface 120 of the substrate.

FIG. 9 illustrates that the molding member 700 is disposed up to a position where the coil pattern 400 partially overlaps the second bending region CA2, but the embodiment is not limited thereto, and the molding member 700 may also be formed while having a bending region so as not to overlap the second bending region CA2.

Figure 10:
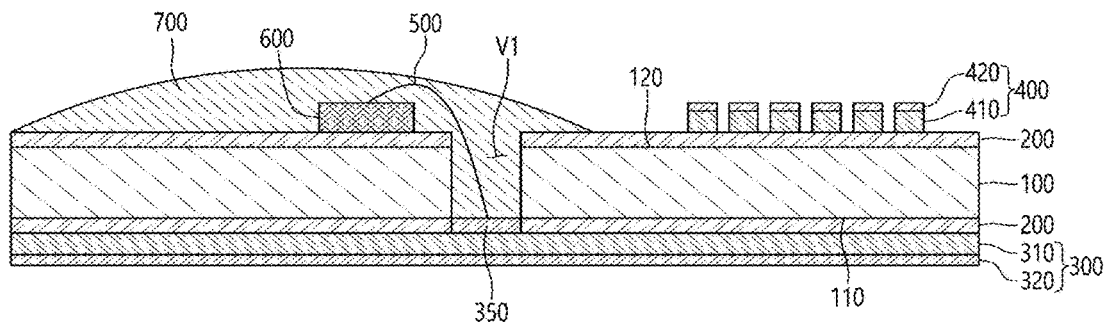
FIG. 10 is a view showing a cross-sectional view taken along line E-E' of FIG. 9.

Referring to FIGS. 9 and 10, the molding member 700 may be disposed while surrounding the chip 600, the wire 500, and the first via V1.

That is, the first via V1 may be disposed at a position overlapping the molding member 700. That is, the first via V1 may be surrounded by the molding member 700.

Accordingly, the wire connecting the circuit pattern 300 and the chip 600 may be protected by the molding member 700.

Figure 11:
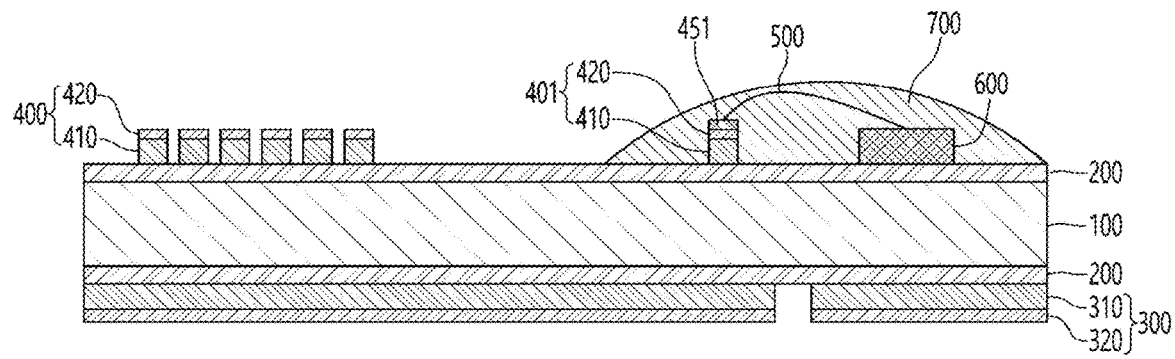
FIG. 11 is a view showing a cross-sectional view taken along line F-F' of FIG. 9.
Figure 12:
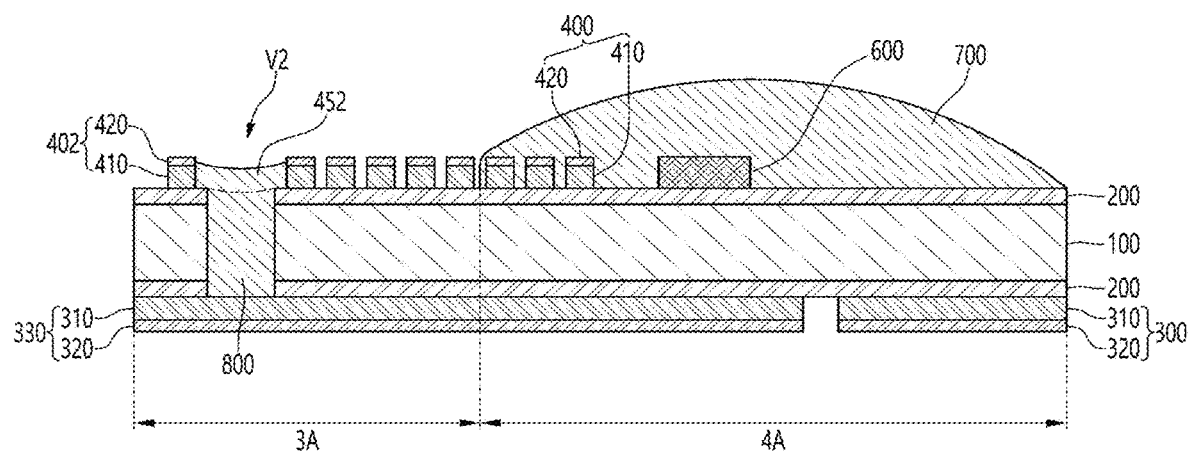
FIG. 12 is a view showing a cross-sectional view taken along line G-G' of FIG. 9.
Figure 13:
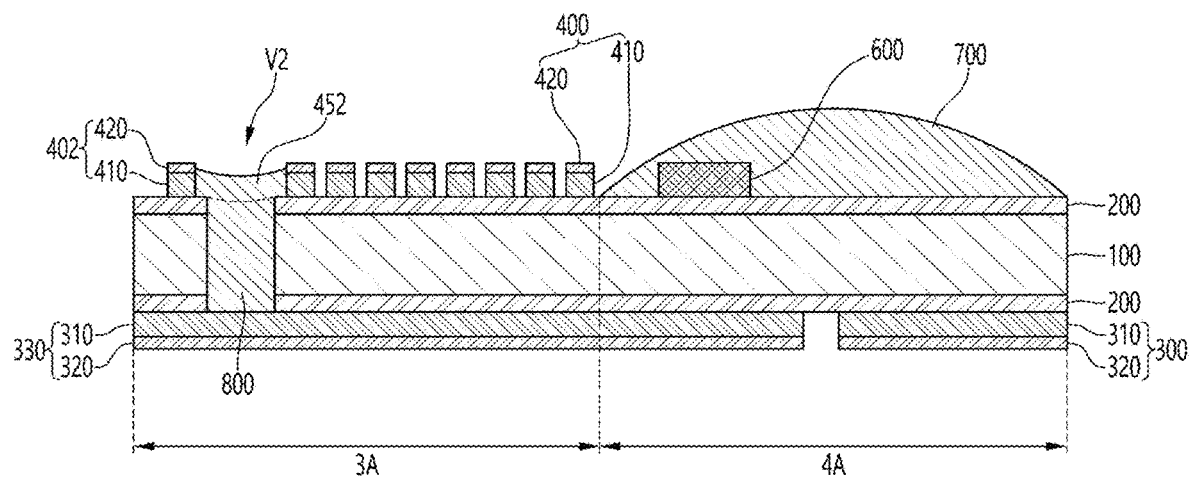
FIG. 13 is a view showing an example of another cross-sectional view taken along line G-G' of FIG. 9.
Figure 14:
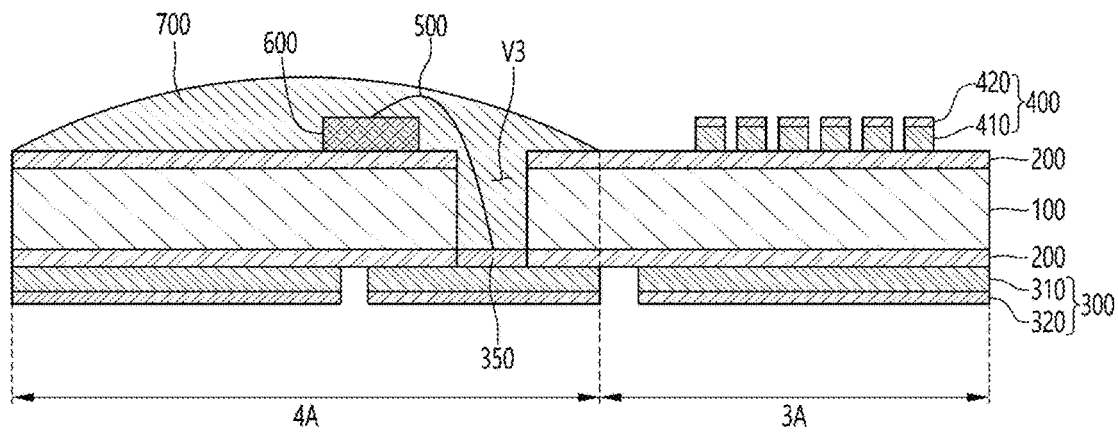
FIG. 14 is a view showing a cross-sectional view taken along line H-H' of FIG. 9.

Referring to FIGS. 9 and 11, the molding member 700 may be disposed while partially surrounding the chip 600, the wire 500, and the coil pattern 400.

That is, the first terminal 401 of the coil pattern 400 may be disposed at a position overlapping the molding member 850. That is, the first terminal 401 may be surrounded by the molding member 700.

Accordingly, the wire 500 connecting the first terminal 401 of the coil pattern 400 and the chip 600 may be protected by the molding member 700.

Referring to FIGS. 9 and 12 to 14, the molding member 700 may be disposed while surrounding the chip 600 and the wire 500.

The molding member 700 may be disposed on a partial region of the smart IC module. Accordingly, the substrate 100 may include a third region 3A where the molding member 700 is not disposed and a fourth region 4A where the molding member 700 is disposed.

The second via V2 may be disposed at a position that does not overlap the molding member 700, and the third via V3 may be disposed at a position that overlaps the molding member 700. That is, the second via V2 may be disposed outside the molding member 700, and the third via V3 may be disposed inside the molding member 700. That is, the second via V2 may be disposed on the third region 3A, and the third via V3 may be disposed on the fourth region 4A.

That is, the connection circuit pattern 330 may extend toward the inside of the molding member from the outside of the molding member, the second via V2 may be formed in a region corresponding to the connection circuit pattern outside the molding member 700, and the third via V3 may be formed in a region corresponding to the connection circuit pattern inside the molding member 700.

In other words, the connection circuit pattern 330 may extend toward the fourth region 4A from the third region 3A, the second via V2 may be formed on a region corresponding to the connection circuit pattern on the third region 3A, and the third via V3 may be formed on a region corresponding to the connection circuit pattern on and the fourth region 4A.

Accordingly, a plurality of coil patterns may be disposed between the second via V2 and the fourth region 4A.

Alternatively, the plurality of coil patterns may be disposed between the second terminal 402 and the fourth region 4A.

That is, at least a part of the coil pattern 400 may be disposed in the third region 3A. That is, at least a part of the coil pattern 400 may be disposed in the third region 3A, and another part may be disposed in the fourth region 4A.

In addition, a part of the second bending region CA2 may be disposed in the third region 3A. That is, a part of the second bending region CA2 may be disposed in the third region 3A, and another part may be disposed in the fourth region 4A.

Accordingly, the second via V2 may be formed at a position that does not overlap the molding member 700, and the third via V3 may be formed at a position that overlaps the molding member 700.

Therefore, the second via V2 and the connection member 800 may be disposed outside the molding member 700 and may be disposed at a position that does not overlap the molding member 700, and the third via V3 and the connection circuit pad portion 350 may be disposed at a position that overlaps the molding member 700 and may be disposed while being surrounded by the molding member 700.

That is, the smart IC module according to another embodiment does not directly wire-bond the chip and the second terminal of the coil pattern, and the smart IC module connects by wire bonding in a region closer to the chip than the second terminal through the connection member, thereby reducing the arrangement area of the molding member.

Therefore, since it is not necessary to dispose the molding member up to the second terminal disposed on the edge of the substrate, the smart IC module and the card module may be easily adhered through the edge of the substrate.

Hereinafter, an IC card including a smart IC module according to an embodiment will be described with reference to FIGS. 15 and 16.

Figure 15:
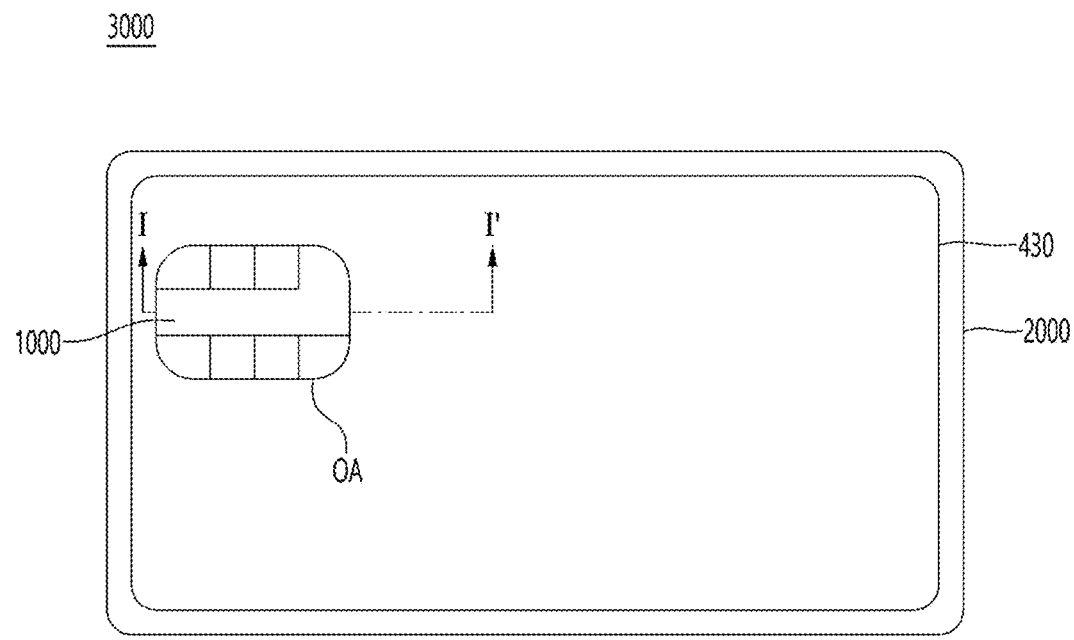
FIG. 15 is a view showing a top view of an IC card according to an embodiment.
Figure 16:
FIG. 16 is a view showing a cross-sectional view taken along line I-I' of FIG. 15.

Referring to FIGS. 15 and 16, an IC card 3000 according to the embodiment may include a smart IC module 1000 and a card module 2000.

In detail, the card module 2000 may include an opening region OA, and the smart IC module 1000 may be disposed inside the opening region OA.

The card module 2000 may have the standard of a credit card or transportation card that are generally used, but the embodiment is not limited thereto.

The card module 2000 may be formed by stacking at least one transparent or opaque synthetic resin sheet and then performing thermocompression bonding. For example, in the card module 2000, the transparent or opaque synthetic resin sheet may include any one resin material among a polyvinylchloride (PVC) sheet, a polycarbonate (PC) sheet, a polyethylene terephthalate (PET) sheet, a glycol modified polyethylene terephthalate (PETG) sheet, a sheet made of a mixture of polyvinylchloride (PVC) and acrylonitrile butadiene styrene (ABS) resin, a sheet made of a mixture of polycarbonate (PC) and glycol modified polyethylene terephthalate (PETG) resin, and a polyester-based synthetic paper.

In addition, the embodiment is not limited thereto, and the card module may include a metal material.

The smart IC module 1000 and the card module 2000 may each include an antenna. In detail, the smart IC module 1000 and the card module 2000 may each include an antenna including a coil pattern. In more detail, the smart IC module 1000 may include a first coil pattern including the coil pattern described above, and the card module 2000 may include a second coil pattern 430.

The first coil pattern and the second coil pattern may be not in physical contact with each other and may exchange signals with each other to recognize information according to the signal from the chip.

The second coil pattern 430 may be disposed along an edge of the card module 2000. In addition, the second coil pattern 430 may also be disposed gradually closer to the smart IC module 1000 from the edge of the card module 2000.

FIG. 15 illustrates that the card module 2000 includes the second coil pattern, but the embodiment is not limited thereto. The IC card according to the embodiment may include only the coil pattern of the smart IC module.

Referring to FIG. 16, the smart IC module 1000 and the card module 2000 may be adhered to each other. In detail, the smart IC module may be adhered to the card module 2000 inside the opening region OA of the card module 2000 through an adhesive layer 1500.

As described above, in the IC card according to the embodiment, the smart IC module and the card module may be easily adhered by sufficiently securing the adhesive region of the smart IC module, that is, a region where the adhesive layer 1500 is disposed.

The characteristics, structures and effects described in the embodiments above are included in at least one embodiment but are not limited to one embodiment. Furthermore, the characteristic, structure, and effect illustrated in each embodiment may be combined or modified for other embodiments by a person skilled in the art. Thus, it should be construed that contents related to such a combination and such a modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

What is claimed is:

1. A smart IC substrate comprising:
a substrate including one surface and an other surface;
a circuit pattern and a connection circuit pattern disposed on the one surface; and
a coil pattern disposed on the other surface,
wherein a chip mounting region is formed on the other surface,
wherein the coil pattern is electrically connected to a first terminal and a second terminal,
wherein the substrate includes a first region disposed inside the coil pattern and a second region disposed outside the coil pattern,
wherein the first terminal is disposed in the first region,
wherein the second terminal is disposed in the second region,
wherein the second terminal and the connection circuit pattern include an overlapping region in which they overlap each other in a vertical direction,
wherein a first via is formed in the first region corresponding to the circuit pattern of the substrate,
wherein a second via is formed in the second region of the substrate and is formed in the overlapping region,
wherein a third via is formed in the first region corresponding to the connection circuit pattern of the substrate,
wherein a connection member is disposed to fill inside the second via, and
wherein the second terminal is connected to the connection circuit pattern by the connection member.

2. The smart IC substrate of claim 1, wherein the coil pattern includes a concave portion provided adjacent to the second via and concave toward the first region, and
wherein the connection circuit pattern overlaps the concave portion in the vertical direction.

3. The smart IC substrate of claim 1, wherein the coil pattern includes first bending regions disposed in a corner region of the coil pattern and a second bending region between the first bending regions, and
wherein the second bending region is disposed closer to a chip mounting region than other regions.

4. A smart IC module comprising:
a substrate including one surface and an other surface;
a circuit pattern and a connection circuit pattern disposed on the one surface; and
a coil pattern and a chip disposed on the other surface,
wherein the coil pattern is electrically connected to a first terminal and a second terminal,
wherein the substrate includes a first region disposed inside the coil pattern and a second region disposed outside the coil pattern,
wherein the first terminal is disposed in the first region,
wherein the second terminal is disposed in the second region,
wherein the second terminal and the connection circuit pattern include an overlapping region in which they overlap each other in a vertical direction,
wherein a third via formed in a region corresponding to the connection circuit pattern is formed in the first region of the substrate,
wherein a second via is formed in the second region of the substrate and is formed in the overlapping region,
wherein a connection member is disposed to fill inside the second via,
wherein the chip is wire bonded to the first terminal and the connection circuit pattern is exposed through the third via, and
wherein the second terminal is connected to the connection circuit pattern by the connection member including a conductive paste.

5. The smart IC module of claim 4, wherein the substrate includes a first via formed on a region corresponding to the circuit pattern,
wherein the circuit pattern includes a circuit pad portion exposed by the first via, and
wherein the circuit pad portion and the chip are connected to a wire through the first via.

6. The smart IC module of claim 4, wherein the first terminal includes a first coil pad portion, and
wherein the chip is wire bonded to the first coil pad portion of the first terminal.

7. The smart IC module of claim 6, wherein the wire is wrapped by a molding member.

8. The smart IC module of claim 4, wherein the coil pattern includes a concave portion provided adjacent to the second via and concave toward the first region, and
wherein the connection circuit pattern overlaps the concave portion in the vertical direction.

9. The smart IC module of claim 8, wherein the second terminal includes a second coil pad portion connected to the second terminal, and wherein the connection member is in contact with the connection circuit pattern and the second coil pad portion.

10. The smart IC module of claim 9, wherein the second coil pad portion is integrally formed with the connection member.

11. The smart IC module of claim 4, wherein the connection circuit pattern includes a connection circuit pad portion disposed in the overlapping region.

12. The smart IC module of claim 7, wherein the substrate includes a third region in which the molding member is not disposed and a fourth region in which the molding member is disposed, and wherein the second via and the second terminal are disposed in the third region, and the first via and the third via are disposed in the fourth region.

13. The smart IC module of claim 12, wherein at least a portion of the coil pattern is disposed in the third region.

14. The smart IC module of claim 12, wherein the coil pattern includes first bending regions disposed in a corner region of the coil pattern and a second bending region between the first bending regions, and wherein the second bending region is disposed closer to a chip mounting region than other regions.

15. The smart IC module of claim 14, wherein a part of the second bending region is disposed in the third region.

16. An IC card comprising:

a card module including an opening region; and the smart IC module of claim 4 disposed in the opening region.

* * * * *